(12) United States Patent
Shaber et al.

(10) Patent No.: US 8,051,970 B2
(45) Date of Patent: Nov. 8, 2011

(54) SWINGING CHUTE LINKAGE ASSEMBLY

(75) Inventors: Kevin M. Shaber, Rochester, MN (US); Thomas G. Lindblom, Claremont, MN (US)

(73) Assignee: McNeilus Truck and Manufacturing, Inc., Dodge Center, MN (US)

( * ) Notice: Subject to any disclaimer, the term of this patent is extended or adjusted under 35 U.S.C. 154(b) by 259 days.

(21) Appl. No.: 12/502,361

(22) Filed: Jul. 14, 2009

(65) Prior Publication Data
US 2011/0011698 A1    Jan. 20, 2011

(51) Int. Cl.
*B65G 11/00* (2006.01)
(52) U.S. Cl. ............... 193/10; 193/4; 193/25 E
(58) Field of Classification Search .................. 193/2 A, 193/10, 2 R, 4, 25 E; 414/523
See application file for complete search history.

(56) References Cited

U.S. PATENT DOCUMENTS

| | | | |
|---|---|---|---|
| 3,456,769 A * | 7/1969 | Prichard et al. .................. 193/4 |
| 3,774,741 A | 11/1973 | Johnson | |
| 3,930,567 A | 1/1976 | Sims | |
| 4,458,800 A | 7/1984 | Christenson | |
| 4,498,568 A | 2/1985 | Christenson | |
| 4,919,249 A * | 4/1990 | Alexander ........................ 193/6 |
| 5,056,641 A | 10/1991 | Loefke et al. | |
| 6,609,603 B2 * | 8/2003 | Cole ............................... 193/10 |
| 6,719,118 B1 * | 4/2004 | Eull et al. ........................ 193/10 |
| 6,868,953 B1 | 3/2005 | Thompson | |
| 6,918,481 B2 | 7/2005 | Quigley et al. | |
| 7,314,243 B2 | 1/2008 | Okada et al. | |

* cited by examiner

*Primary Examiner* — James R Bidwell
(74) *Attorney, Agent, or Firm* — Nikolai & Mersereau, P.A.; C. G. Mersereau

(57) ABSTRACT

The hinge assembly of the present invention is a novel configuration that utilizes multiple arcuate shaped clevis elements. The configuration produces a compact, stable, and efficient means for transmitting an actuation force to retract or deploy one or more sections of a folding chute assembly utilized on transit concrete mixing vehicles.

10 Claims, 7 Drawing Sheets

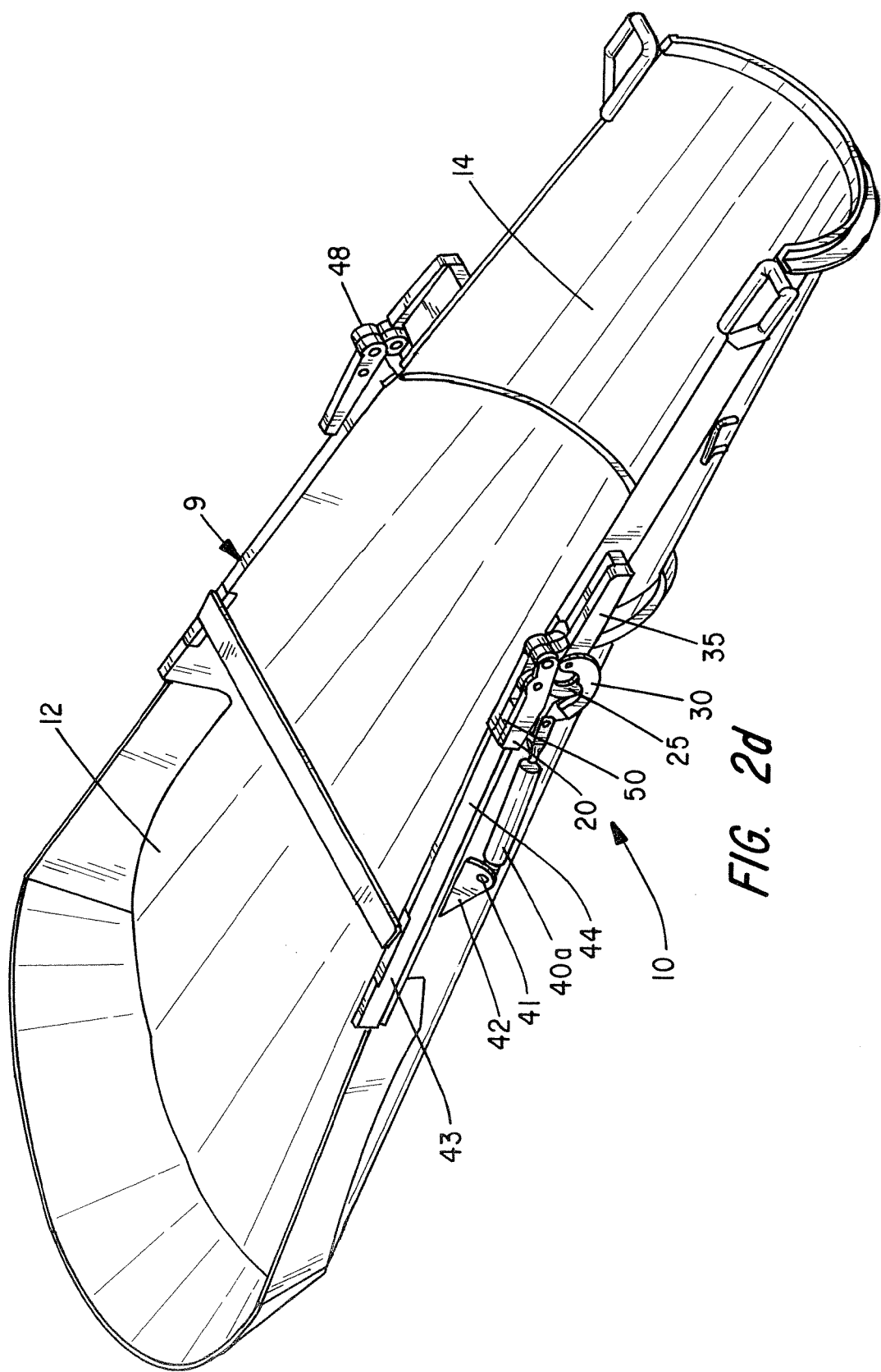

SWINGING CHUTE LINKAGE ASSEMBLY

CROSS-REFERENCED TO RELATED APPLICATIONS

Not applicable

STATEMENT REGARDING FEDERALLY SPONSORED RESEARCH OR DEVELOPMENT

Not applicable

TECHNICAL FIELD

The invention relates generally to transit concrete mixing and delivery vehicles and, more particularly, to a multi-component linkage assembly for a concrete chute attached to a concrete mixer. The invention is particularly suited for manipulating a folding concrete chute from a stored (folded) configuration to a deployed configuration and back again.

BACKGROUND OF THE INVENTION

It is common for transportable mixing units, like those employed on concrete trucks, to use a plurality of hinged chute sections, for movement between a retracted transport position and an extended discharge position, and for the transfer and discharge of concrete mix from a transport vehicle. It is well known in the art that a variety of hydraulically, pneumatically, or electrically driven assemblies are available to actuate the chute deployment and retraction process. Devices representative of the prior art are described in U.S. Pat. Nos. 4,458,800; 5,056,641;and 6,918,481 assigned to the same assignee as the present application.

The vehicles themselves may be of a front or rear discharge type. In rear discharge vehicles the mechanism for discharging and delivering concrete from a mixing drum is positioned at the rear of the vehicle. And in a front discharge type, the mechanism for discharging and delivering concrete from a mixing drum is located above the vehicle's cab enclosure at the front of the vehicle.

It is well known in the art that folding chute sections utilized for the discharge and delivery of concrete from the mixing drum are typically heavy and produce large stresses on the chute joints and actuator assemblies, particularly when loaded with concrete. The operation actuator and hinge assemblies experience significant resistive and torsional forces that result in rapid damaging wear and tear upon the parts. Additionally, designs commonly employed within the industry, while successful, are inefficient as to the delivery of functional forces from the actuator system to the point of deployment because of limitations in the hinge mechanisms. U.S. Pat. No. 3,774,741 (hereafter "the '741 patent") exemplifies this design. The embodiment depicted in FIGS. 1-7 of the '741 patent shows a traditional single eyelet hinge design. Two chute segments are rotatably linked by a pair of hinges. The hinges comprise a pair of hinge eyelets, one eyelet on each side of each chute segment. These hinges utilize a single pivot bolt to rotatably fasten the chute segments. U.S. Pat. Nos. 4,498,568 and 4,458,800 also utilize this single eyelet hinge system. U.S. Pat. No. 3,930,567 exemplifies a slight modification to the single eyelet design where extended joint arms are employed.

One common limitation with existing single eyelet hinge configurations occurs because a strong twisting force and motion results when the actuator operates as the actuator force is delivered through the joint to deploy or retract the chute segment. When actuator force is applied, inertial, gravitational, and frictional forces resist the desired rotational movement about the pivot. Delivery of the actuator force results in twisting forces at the weakest point, the rotational axis, within the system. The force will dissipate in all possible directions until the resistive forces are maximized and the movement about the hinges is the least resistive outlet for energy dissipation. The twisting forces place unwanted stress on the hinge components resulting in undue wear and tear on the components. This wear and tear on the chute joints results in excessive maintenance costs and inconvenient down time to repair the vehicle.

SUMMARY OF THE INVENTION

An embodiment of the current invention depicts a folding chute assembly for a transit concrete mixing vehicle or the like. It comprises a pair of consecutive chute segments including an upper chute segment and a lower chute segment, the upper chute segment being pivotally attached in an end-to-end relationship with the lower chute segment. The upper chute segment and lower chute segment each have cooperatively mated ends to form a continuous channel for transfer of concrete mixture. It also contains a hinge arrangement fixedly attached to pivotally connect the upper chute segment with the lower chute segment at the cooperatively mated ends wherein said hinge provides for the deployment of the lower chute segment from a stowed configuration to a deployed configuration for the delivery of concrete mixture. The hinge arrangement comprises a plurality of stabilizing elements. The hinge may further comprise (1) a stabilizing clevis primary mounting bracket, fixedly attached to said upper chute segment, (2) an arcuate lever element, pivotally connected to the primary mounting bracket, (3) an arcuate clevis primary linkage element that is pivotally connected to the arcuate lever element, and (4) a secondary mounting bracket that is pivotally connected to the primary linkage element, pivotally connected to the primary mounting bracket, and fixedly attached to said lower chute segment.

The current advance provides a folding delivery chute joint structure for concrete mixers that increases the strength of the joint and increases the efficient delivery of actuation energy through the joint, which in turn results in a component with reduced wear, lower maintenance costs, and less unpredictable maintenance down time.

The hinge structure prevents tangential rotation about the joint pivot pins, thereby enabling transfer of operational energy more efficiently and effectively to deploy or retract the concrete delivery chute segments.

The current invention applies multiple forked or clevis elements to create a balanced, stronger joint that resists torsional or twisting aspects and overcomes deficiencies of designs currently used in the art. A resulting multi-pronged design of the current linkage configuration provides a plurality of spaced pivot attachment points on opposing sides of connecting linkage components. This three-pronged design supports the attendant joints along the entire pivot axis in the deployment/retraction linkage system. The uniform support of the three-pronged arcuate design, derived from the extended support at these pivotal axis points, counteracts the torsional forces that have the tendency to induce an undesired rotation that is generally perpendicular to the direction of the desired hinge rotation.

In addition, the three pronged design increases the number of contact points about the pivotal axis, which in turn increases the strength of the pivotal joint because the additional contact points provide greater stability and control of the pivot bolt or pin. The rotational resistive forces are deployed on either side of the rotation pivot point created by traditional designs and thereby prevent the pivot pin from undergoing perpendicular rotation about the axis point.

BRIEF DESCRIPTION OF THE DRAWINGS

The foregoing and other advantages will become apparent upon examination of the description and the drawings contained herein, wherein:

FIG. 2d is a perspective view of a distribution chute of a type pertaining to the current invention with a lower chute segment in a deployed configuration;

DETAILED DESCRIPTION

Figure 2A:
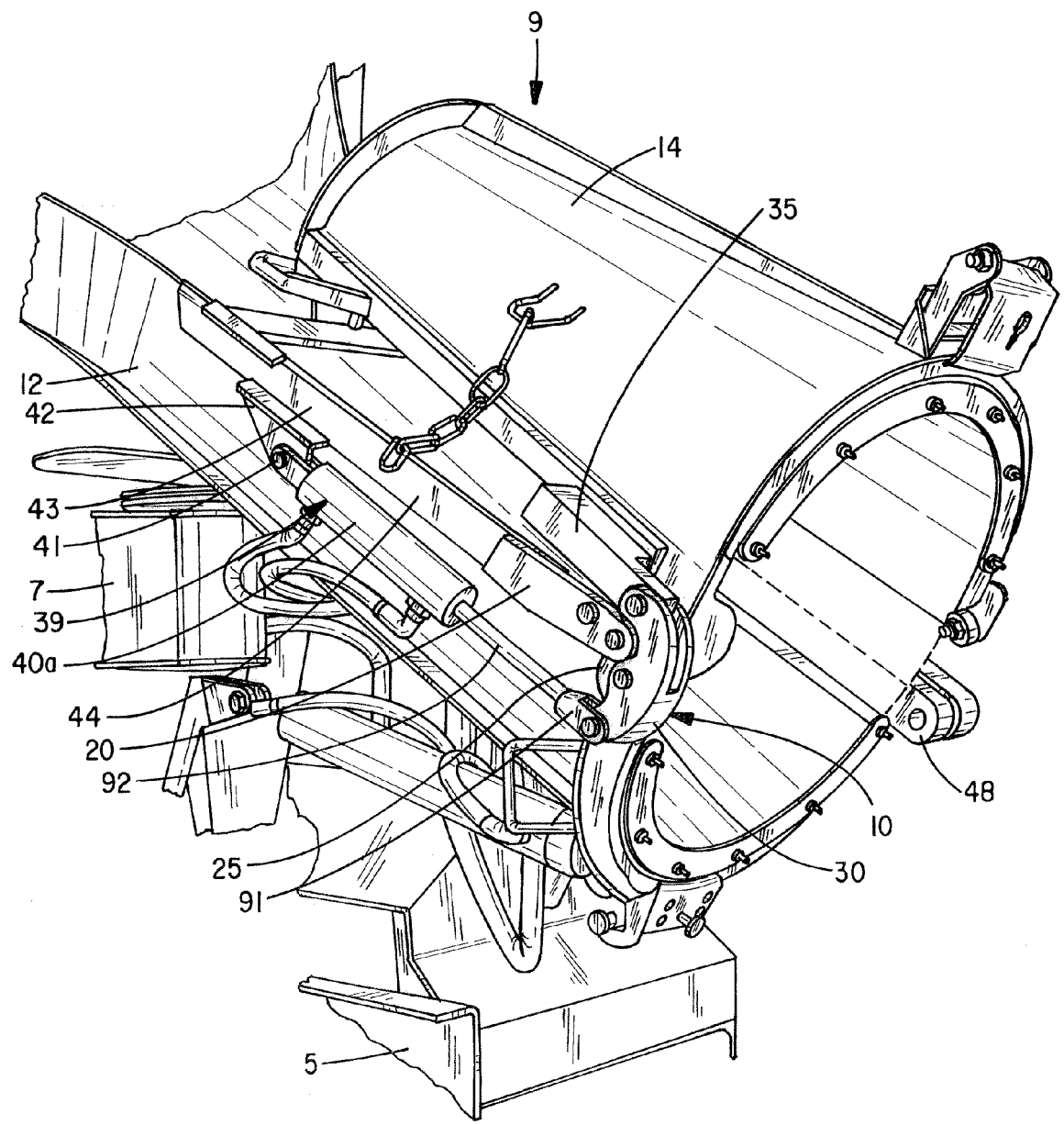
FIG. 2a is an enlarged perspective view of an embodiment of a distribution chute of a type pertaining to the current invention.
Figure 2B:
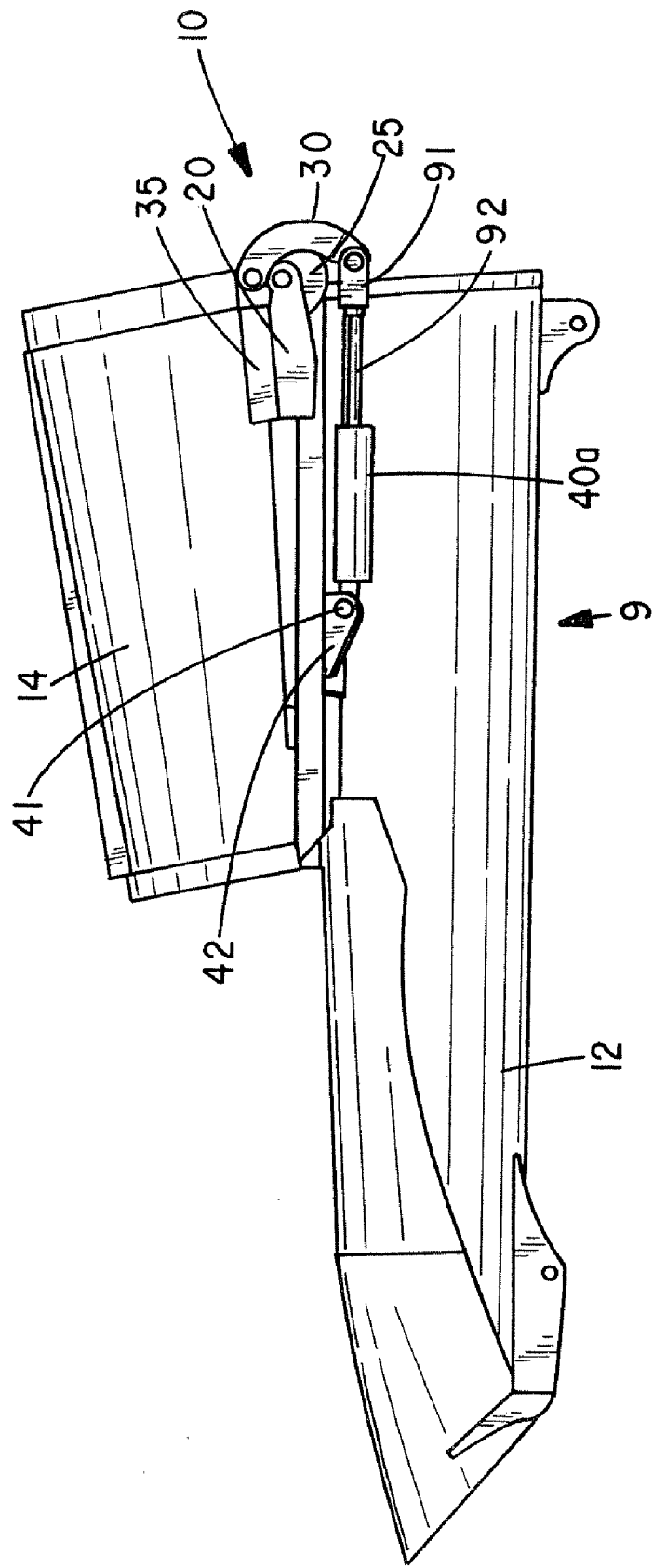
FIG. 2b is a side elevational view of a distribution chute of a type pertaining to the current invention with a lower chute segment folded in a stowed configuration.
Figure 2C:
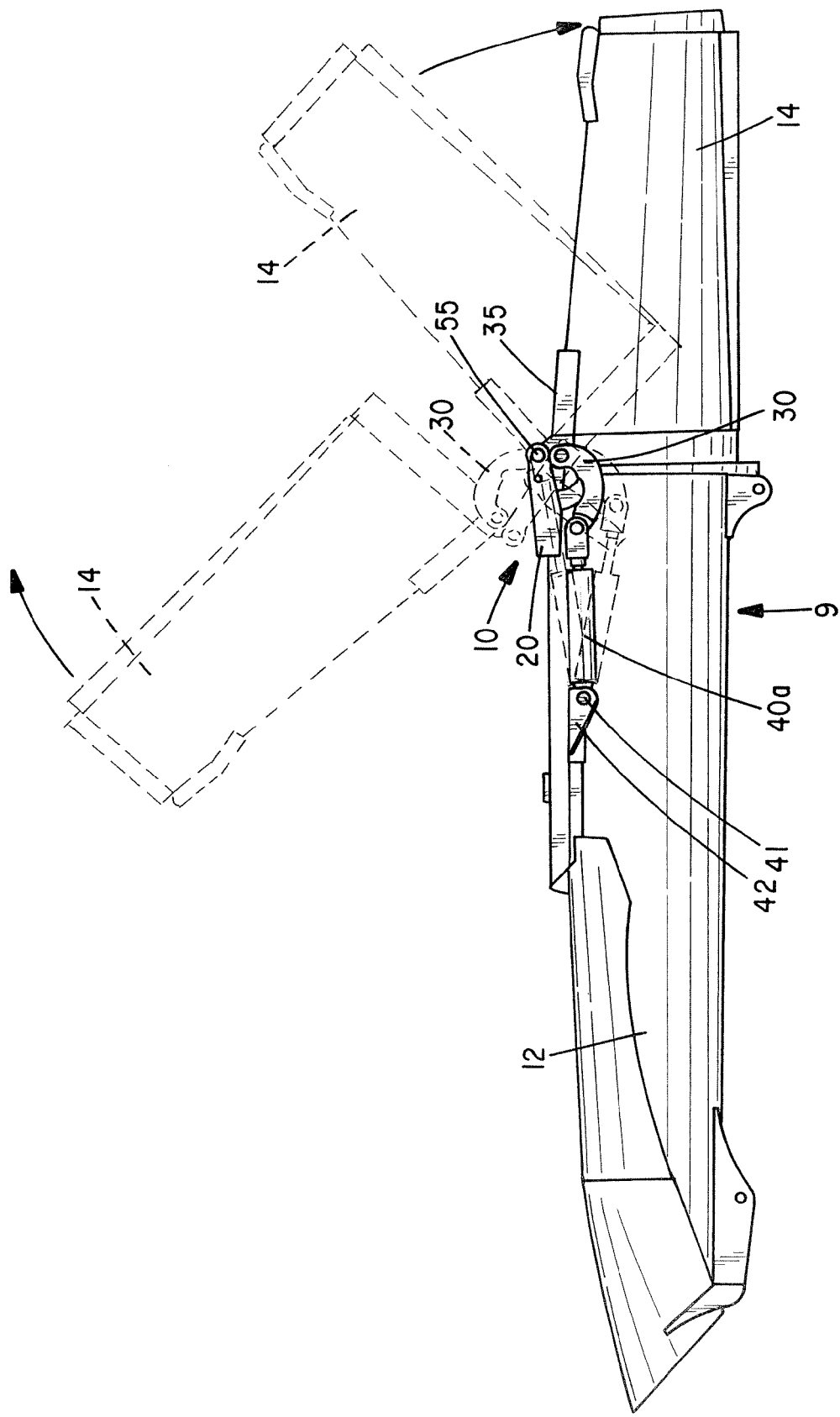
FIG. 2c is a side elevational view of a distribution chute of a type pertaining to the current invention showing the movement of the lower chute deployment configurations in phantom.
Figure 3:
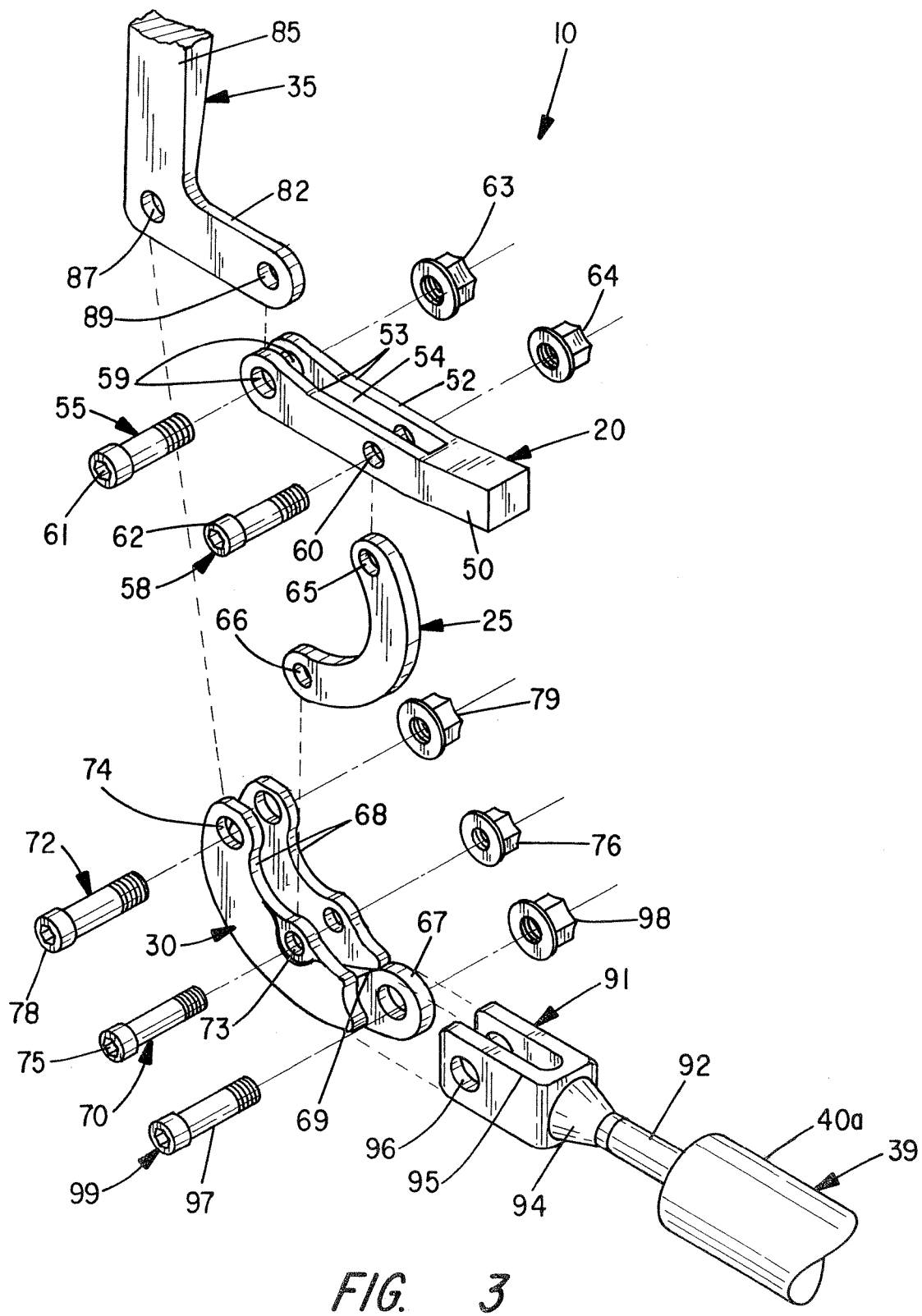
FIG. 3 is an exploded view of a distribution chute hinge in accordance with the current invention.

Embodiments of the present invention are described herein with reference to FIGS. 1 through 3. The principles, the illustrative embodiments, and modes of operation for the present invention are described in the following specification. However, the invention, which is intended to be protected, is not to be construed as limited to the particular embodiment disclosed. Further, the embodiments described herein are meant to be regarded as illustrative rather than restrictive. Variations and changes may be made by others skilled in the art, and equivalents employed, without departing from the spirit of the present invention. Accordingly, it is expressly intended that all such variations, changes, and equivalents that fall within the spirit and scope of the present invention as defined in the claims, be embraced thereby.

Figure 1A:
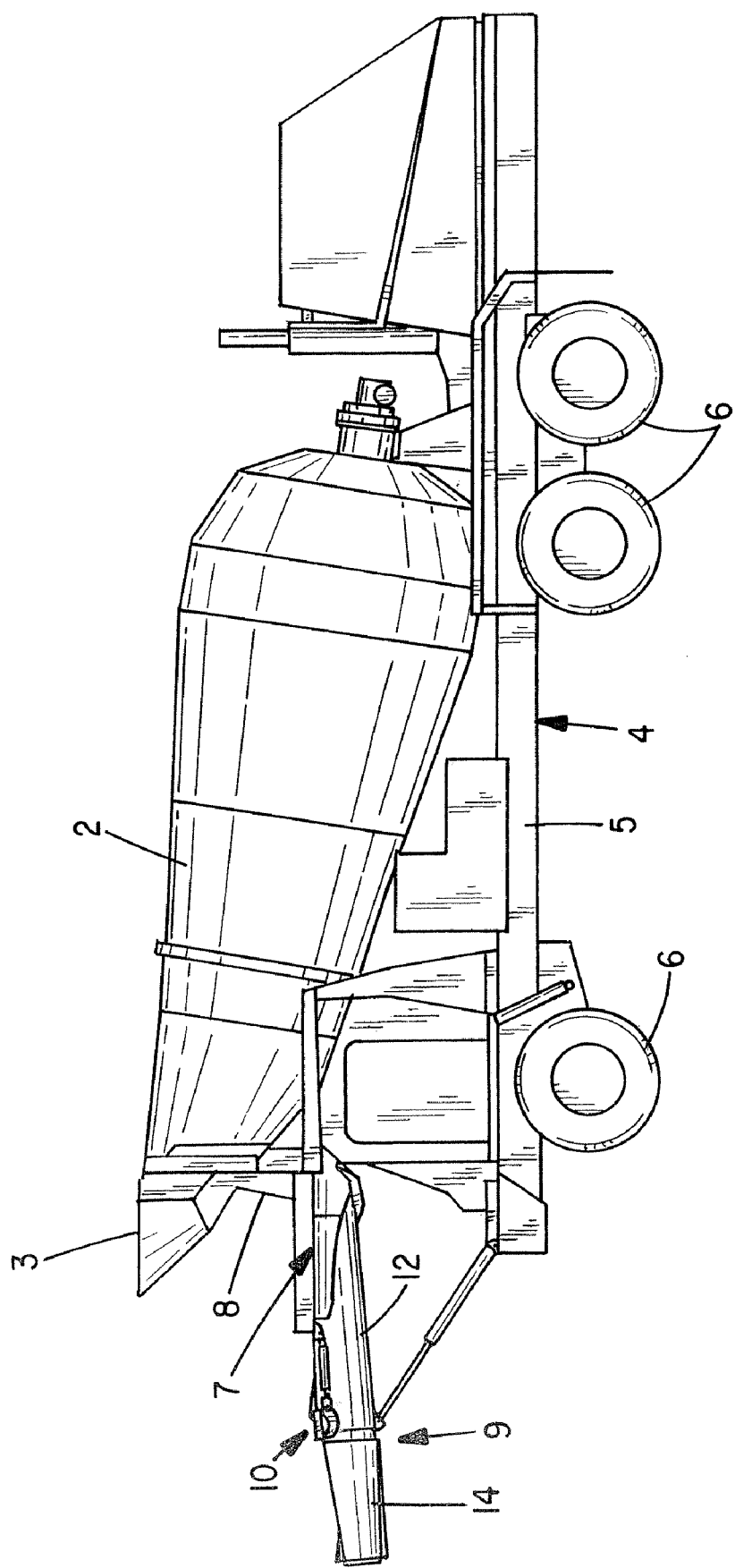
FIG. 1a is a side elevational view of a front discharge transit concrete mixing vehicle showing an embodiment of a type pertaining to the current invention.
Figure 1B:
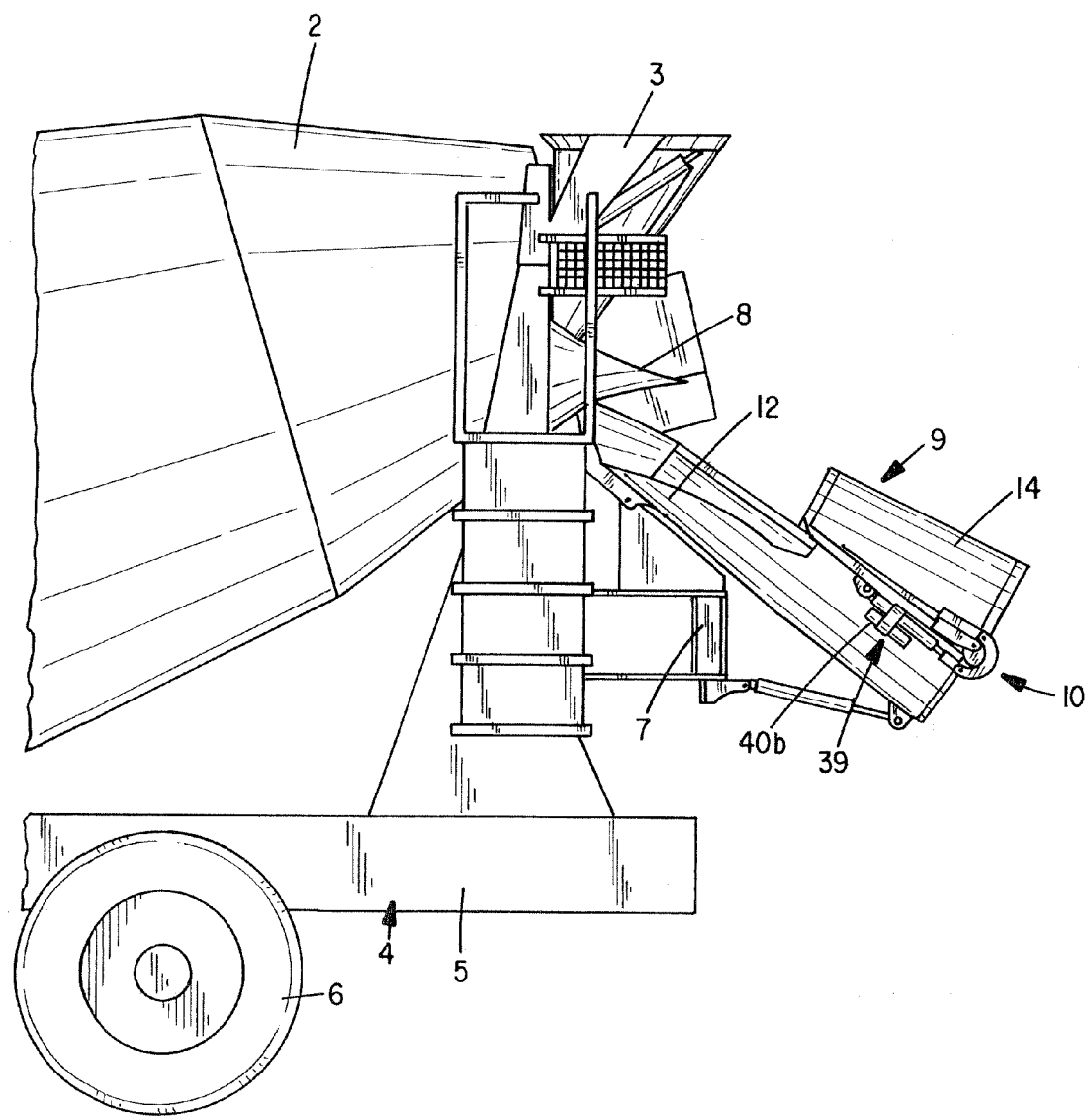
FIG. 1b is a side elevational view of the rear fragmentary portion of a rear discharge transit concrete mixing vehicle showing an embodiment of a distribution chute of a type pertaining to the current invention.

As illustrated in FIGS. 1a and 1b, the embodiments of the current invention movably attach to a conventional transit concrete mixing truck which possesses a mixing drum 2 and a discharge spout 3 attached to and supported by a chassis 4 comprising a body frame member 5 and wheels 6, having a conventional combination pivoting mount 7 and discharge hopper 8 for attaching a standard chute assembly 9 to the truck body frame member 5. The embodiments include a hinge assembly generally at 10 for mechanically actuating and pivotally connecting an upper chute segment 12 to a lower chute segment 14 to produce the chute assembly 9.

Referring to FIG. 2a, the illustrated hinge assembly 10 is a pin and clevis mechanism and includes four elements that are movably connected by a plurality of pivot joints. The elements may include a primary mounting bracket 20, an arcuate lever element 25, an arcuate primary linkage element 30, and a secondary mounting bracket 35. These elements are rotatably connected through a plurality of pivots as will be explained.

Again referring to FIG. 2a, the chute possesses an actuator assembly 39. The actuator assembly 39, preferably employing a double acting fluid (hydraulic or pneumatic) cylinder arrangement 40a, is provided to mechanically operate the hinge assembly 10 to pivot, deploy, or retract the pin and clevis arrangement to pivot the lower chute segment 14. As seen in FIG. 1b, the actuator assembly 39 may also employ an electrical mechanical actuator cylinder arrangement 40b. The cylinder arrangements 40a and 40b are coupled to the chute by actuator pivot pin 41 or other suitable pivotal connection attached to an actuator mounting bracket 42 which may be welded to the upper chute segment 12.

One aspect of the present invention is to provide a stronger hinge assembly 10 through which to effectuate an efficient transfer of energy from the cylinder arrangement 40a or 40b to the folding lower chute segment 14 for pivotal deployment or retraction of the lower chute segment 14, as depicted in FIG. 2c. A stronger hinge assembly is achieved by utilizing a clevis design with multiple joint members each possessing multiple pivot points. This configuration results in even distribution of actuation forces upon the joint and a joint with increased stability.

A class of cement delivery chutes, to which the embodiments depicted in FIGS. 1-2d pertain, contain two pivotally connected folding segments. As seen in FIGS. 2a-2d, the upper chute segment 12 possesses a longitudinal direction that runs from a proximal end to a distal end. FIGS. 1a and 1b show the proximal end of the upper chute segment 12 is designed to receive and direct mixed concrete, discharged from the mixing drum 2, directed through the spout 3 and discharge hopper 8. The proximal end of the upper chute segment 12 is attached and positioned at or near the discharge hopper 8. The diameter of upper chute segment 12 may gradually narrow proceeding from the proximal end to the distal end. FIGS. 2a and 2d illustrate upper chute segment 12 as being generally semi-circular in cross-sectional shape and forming a concave internal trough and a convex external wall. The semi-circular shape is designed to include a reinforcing member 43 that runs parallel to upper chute segment 12 and forms a first upper edge 44 of the upper chute segment 12.

FIGS. 2a and 2d show the lower chute segment 14 is pivotally attached at or near the distal end of the upper chute segment 12 by hinge assembly 10 and a second hinge assembly 48 of any known configuration. This second hinge assembly 48 may be of any adequately functional configuration and may also be a second hinge of the inventive configuration described herein. Lower chute segment 14 includes a proximal end and a distal end. The lower chute segment 14 is configured such that the cross-sectional shape of the proximal end cooperatively mates with the distal end of upper chute segment 12, when lower chute segment 14 is unfolded and fully deployed. In this manner, a uniformly narrowing channel may be created over the entire length of the chute. This cooperative mating of segments provides for efficient, continuous transfer of concrete mixture from the raised opening in the mixing drum 2 to a convenient location for delivery.

As seen in FIGS. 2a-2d, a primary mounting bracket 20 is fixedly attached to upper chute segment 12 and is generally parallel to the longitudinal axis of the chute. Parallel mounting is necessary to allow proper pivotal movement of the chute segments and to compensate for a gradual narrowing of the cross-sectional diameter of the chute from the proximal end to the distal end of the chute segment.

As seen in FIG. 3, embodiments of the current invention employ a generally "U"-shaped clevis member or primary mounting bracket 20. The clevis or forked design greatly improves the strength and stability of the joint by providing support on both ends of the pivots associated with the primary mounting bracket 20. This type of support is not found in prior linkage systems for folding delivery chute joint structures in concrete mixers, and the new configuration greatly reduces unwanted twisting motion in the pivot joint.

The primary mounting bracket 20 comprises a proximal end and a distal end. The proximal direction of the mounting bracket corresponds to the proximal direction of the chute, and the distal end of the mounting bracket corresponds to the distal direction of the chute.

As seen in FIG. 3, the primary mounting bracket 20 includes a solid weldment section 50 and a hinge section 52. Hinge section 52 has two primary mounting bracket arm members 53. Mounting bracket arm members 53 are spaced and so configured as to define a gap 54. The weldment section 50 is fixed to the reinforcing member 43, as seen in FIG. 2d, at or near the first upper chute edge 44.

Primary mounting bracket 20, specifically arm members 53, is configured to function as the supporting framework for a plurality of generally transverse pivot joints 55, 58. The primary mounting bracket 20 contains a plurality of corresponding opposed aligned opening pairs 59 and 60 to accommodate threaded pivot pins 61, 62 with corresponding threaded fasteners as nuts 63, 64. The first axle or pivot pin 61 works in cooperation with opposed, aligned opening pair 59 to form a first pivot joint 55. The second pivot pin 62 works in cooperation with the second opposed, aligned opening pair 60 to form the second pivot joint 58. Each opening pair 59, 60 is arranged and so configured to create an axis that is substantially transverse to the chute axis and substantially parallel to a plane created by the top edges of the chute.

As seen in FIG. 2c, this configuration allows for the cooperative rotational movement of the two chute segments around the first pivot joint 55 to pivot between a stowed configuration and a deployed configuration. Pivot pins 61, 62 may be formed using any type of threaded bolt or the like that provides a solid, stable central shaft about which the joint elements may rotate.

Opposed, aligned openings 60 accept a second pivot pin 62 to create a second pivot joint 58 that provides for rotatably mounting generally arcuate lever element 25. The arcuate lever element 25 provides a leverage function in the linkage design, allowing for a compact hinge mechanism at the pivot joint 58. The lever element 25 is a generally flat metal plate and includes a first or proximal opening 65 near the proximal end and a second distal opening 66 at or near the distal end. Opening 65 is positioned to align with opposed, aligned openings 60 in primary mounting bracket 20. The arcuate lever element 25 and the arcuate primary linkage element 30 are rotatably connected by pivot pin 62 positioned within openings 60 and 65.

As generally seen in FIGS. 2a-3, the linkage assembly also possesses a generally arcuate primary linkage element 30. As seen in FIG. 3, linkage element 30 possesses a proximal end and a distal end. The configuration of the proximal end defines the spacing body 69 of generally fork shaped primary linkage element 30. The spacing body 69 configuration further defines a central element eyelet 67. The distal end is formed by two spaced, generally parallel arcuate primary linkage arm members 68 which form a support framework for a plurality of generally transverse pivot joints 70 and 72 accommodated by a plurality of opposed, aligned openings 73, 74 to accomplish this function.

Openings 73 accept a third threaded pivot pin 75 and corresponding threaded nut 76 to create pivot joint 70. The distal end opening 66 of arcuate lever element 25 attaches to rotate relative to arcuate primary linkage element 30 at pivot joint 70.

The primary linkage element 30, opening pair 74, a forth threaded pivot pin 78, with threaded nut 79 form pivot joint 72, with an axis that is substantially transverse to the chute axis and substantially parallel to the plane created by the top edges of the chute.

As seen in FIGS. 2a-2d and 3, the final element of the hinge assembly 10 is secondary mounting bracket 35, which is a generally "L"-shaped single plate with a proximal end and a distal end. The distal end, comprising a weldment region 85, is fixedly attached to lower chute segment 14 and is generally parallel to the longitudinal axis of the chute. Parallel mounting is necessary to allow proper pivotal movement of the chute segments and to compensate for a gradual narrowing of the cross-sectional diameter from the proximal end to the distal end of the chute segment. The proximal end, or foot portion of the "L", possesses an approximately 90-degree angle and defines a hinge region 82.

A secondary mounting bracket, first opening 87 is defined at or near the proximal end of the secondary mounting bracket 35 and the 90-degree angle of the hinge region 82. Opening 87 of the secondary mounting bracket 35 is aligned with opening pair 74 of linkage element 30 at pivot joint 72 for rotational attachment.

At or near the proximal end of the secondary mounting bracket 35 is a second opening 89, which resides in the hinge region 82. The proximal end of the secondary mounting bracket 35 is configured to reside within the gap 54 of the primary mounting bracket 20. The opening 89 of secondary mounting bracket 35 is aligned with the opposed, aligned opening pair 59 of primary mounting bracket 20. Pivot pin 61 thereby rotatably fastens the primary mounting bracket 20 to the secondary mounting bracket 35. This connection fully establishes the cooperative configuration between the upper chute segment 12 and lower chute segment 14 for the hinge assembly 10.

One final aspect of the current embodiment is the rotatable connection of the primary linkage element 30 to the fluid cylinder 40a, or electrical cylinder 40b, arrangement to provide a means for delivering an actuation force to the hinge assembly 10. The actuator assembly 39 in the form of a double acting fluid (hydraulic or pneumatic) cylinder arrangement 40a, with a piston rod 92 is fixed to clevis member 91 as at 94. The double acting fluid cylinder arrangement 40a may also be performed by an electrical mechanical cylinder actuator 40b. Clevis member 91 includes spaced arm members 95 with opposed, aligned openings 96. The central eyelet 67 of element 30 is rotatably connected to clevis member 95. The central eyelet 67 and opposed, aligned openings 96 are cooperatively positioned to work with a fifth threaded pivot pin 97 and corresponding threaded nut 98 to create a fifth pivot joint 99 to rotatably fasten the actuator assembly 39 to the arcuate primary linkage element 30.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A folding chute assembly for a transit concrete mixing vehicle comprising:

a pair of consecutive chute segments including an upper chute segment and a lower chute segment, the upper chute segment being pivotally attached in an end-to-end relationship to the lower chute segment;

said upper chute segment and said lower chute segment each having cooperatively mated ends to form a continuous channel for transfer of concrete mixture;

a hinge arrangement fixedly attached to pivotally connect the upper chute segment with the lower chute segment at the cooperatively mated ends wherein said hinge provides for the deployment of the lower chute segment from a stowed configuration to a deployed configuration for the delivery of concrete mixture;

wherein, said hinge arrangement comprises a plurality of stabilizing elements connected by clevis mounts further comprising a stabilizing primary mounting bracket in the form of a clevis member fixedly attached to said upper chute segment and pivotally connected by a generally arcuate lever element, to a generally arcuate clevis primary linkage element, a secondary mounting bracket is fixedly attached to said lower chute segment, and pivotally connected to said primary mounting bracket in a clevis mount, said primary linkage element being further pivotally connected to said secondary mounting bracket in a further clevis mount; and wherein said clevis mount arrangements further stabilize said hinge arrangement.

2. A folding chute assembly as in claim 1 wherein said vehicle is selected from front and rear discharge transit concrete mixers.

3. A folding chute assembly as in claim 2 comprising a linear mechanical actuator for operating said hinge pivotally attached to said arcuate clevis primary linkage element in a clevis mounting arrangement for delivery of a force to pivot the lower chute segment between a stowed configuration and a deployed configuration.

4. A folding chute assembly as in claim 3 wherein the mechanical actuator is a double acting cylinder arrangement pivotally attached to said arcuate clevis primary linkage element.

5. A folding chute assembly as in claim 4 wherein said cylinder is a hydraulic cylinder.

6. A folding chute assembly as in claim 4 wherein said cylinder is a pneumatic cylinder.

7. A folding chute assembly as in claim 4 wherein said cylinder is an electric cylinder.

8. A folding chute assembly as in claim 4 wherein said chute segments are arcuate in cross-section.

9. A folding chute assembly as in claim 8 wherein said arc is generally a circular segment.

10. A folding chute assembly as in claim 9 wherein said chute segments are generally longitudinally conical.

* * * * *